(12) United States Patent
Fuller (10) Patent No.: US 10,326,648 B2
(45) Date of Patent: Jun. 18, 2019

(54) VIRTUAL USE OF ELECTRONIC DESIGN AUTOMATION TOOLS

(71) Applicant: Mentor Graphics Corporation, Wilsonville, OR (US)

(72) Inventor: Ronald Fuller, Tualatin, OR (US)

(73) Assignee: Mentor Graphics Corporation, Wilsonville, OR (US)

( * ) Notice: Subject to any disclaimer, the term of this patent is extended or adjusted under 35 U.S.C. 154(b) by 207 days.

(21) Appl. No.: 13/783,183

(22) Filed: Mar. 1, 2013

(65) Prior Publication Data

US 2013/0311627 A1 Nov. 21, 2013

Related U.S. Application Data

(60) Provisional application No. 61/605,747, filed on Mar. 1, 2012.

(51) Int. Cl.
*H04L 12/24* (2006.01)
*H04L 29/08* (2006.01)

(52) U.S. Cl.
CPC ......... *H04L 41/0806* (2013.01); *H04L 67/08* (2013.01)

(58) Field of Classification Search
None
See application file for complete search history.

(56) References Cited

U.S. PATENT DOCUMENTS

| | | | |
|---|---|---|---|
| 2002/0032798 A1* | 3/2002 | Xu | 709/238 |
| 2003/0182150 A1* | 9/2003 | Reddy et al. | 705/1 |
| 2004/0193716 A1* | 9/2004 | McConnell | 709/228 |
| 2005/0076104 A1* | 4/2005 | Liskov et al. | 709/223 |
| 2005/0089048 A1* | 4/2005 | Chittenden et al. | 370/395.54 |
| 2005/0114514 A1* | 5/2005 | Bostrom | H04L 63/102 709/227 |
| 2005/0182843 A1* | 8/2005 | Reistad et al. | 709/230 |
| 2009/0119678 A1* | 5/2009 | Shih et al. | 719/313 |
| 2009/0228281 A1* | 9/2009 | Singleton et al. | 704/275 |
| 2010/0169497 A1* | 7/2010 | Klimentiev | G06F 9/546 709/228 |
| 2010/0269152 A1* | 10/2010 | Pahlavan et al. | 726/3 |
| 2011/0107409 A1* | 5/2011 | Wilkinson | G06F 21/335 726/8 |
| 2012/0033811 A1* | 2/2012 | Hawkes | H04L 63/0428 380/255 |

(Continued)

*Primary Examiner* — Scott B Christensen (57) ABSTRACT

A control server facilitates communication between a tool server hosting an instance of a software tool and a client device employed by a user of the software tool. The client device initially contacts the control server to request the use of the software tool. The control server then arranges for a separate computer to be configured as a tool server that can provide remote access to an instance of the software tool. The control server may provide usage information to the tool server that will control how the software tool may be used. The control server may also provide connection information to the client device, which the client device then can use to establish a connection with the tool server. Using the connection information, the client device then establishes a remote connection with the tool server, allowing the user of the client device to use the software tool hosted on the tool server through the remote connection.

26 Claims, 6 Drawing Sheets

(56) References Cited

U.S. PATENT DOCUMENTS

2012/0290643 A1* 11/2012 Fok Ah Chuen ....... H04W 4/02
709/203
2012/0331521 A1* 12/2012 Ansari ................... H04L 63/08
726/3

* cited by examiner

VIRTUAL USE OF ELECTRONIC DESIGN AUTOMATION TOOLS

RELATED CASES

This application claims priority under 35 U.S.C. § 119 to U.S. Provisional Patent Application No. 61/605,747, entitled "Virtual Use Of Electronic Design Automation Tools," filed on Mar. 1, 2012, and naming Ronald Fuller as inventor, which provisional patent application is incorporated entirely herein by reference.

FIELD OF THE INVENTION

The present invention is directed toward the virtual use of software tools, such as electronic design automation tools. Various implementations of the invention may allow a user to evaluate an electronic design automation tool prior to purchase. Still other implementations of the invention may allow a user to purchase only the desired use of a tool, such as an electronic design automation tool, rather than to license or purchase the entirety of the tool itself.

BACKGROUND OF THE INVENTION

Microdevices, such as integrated microcircuits and microelectromechanical systems (MEMS), are used in a variety of products, from automobiles to microwaves to personal computers. Designing and fabricating microdevices typically involves many steps, known as a "design flow." The particular steps of a design flow often are dependent upon the type of microcircuit, its complexity, the design team, and the microdevice fabricator or foundry that will manufacture the microcircuit. Typically, software and hardware "tools" verify the design at various stages of the design flow by running software simulators and/or hardware emulators, and errors in the design are corrected or the design is otherwise improved.

Several steps are common to most design flows for integrated microcircuits. Initially, the specification for a new circuit is transformed into a logical design, sometimes referred to as a register transfer level (RTL) description of the circuit. The logic of the circuit is then analyzed, to confirm that it will accurately perform the functions desired for the circuit. This analysis is sometimes referred to as "functional verification." After the accuracy of the logical design is confirmed, it is converted into a device design by synthesis software. The device design, which is typically in the form of a schematic or netlist, describes the specific electronic devices (such as transistors, resistors, and capacitors) that will be used in the circuit, along with their interconnections. Preliminary timing estimates for portions of the circuit may be made at this stage, using an assumed characteristic speed for each device. In addition, the relationships between the electronic devices are analyzed, to confirm that the circuit described by the device design will correctly perform the desired functions. This analysis is sometimes referred to as "formal verification."

Once the relationships between circuit devices have been established, the design is again transformed, this time into a physical design that describes specific geometric elements and their interconnections. This type of design often is referred to as a "layout" design. Typically, a designer will perform a number of analyses on the layout design data. For example, with integrated circuits, a designer may analyze the layout design to confirm that it accurately represents the circuit devices and their relationships as described in the device design. A design also may analyze the layout design to confirm that it complies with various design requirements or recommendations, such as the use of minimum spacings between geometric elements or one or more resolution enhancement technique (RET) processes. After the layout design has been finalized, it is converted into a format that can be employed by a mask or reticle writing tool to create a mask or reticle for use in a photolithographic manufacturing process. The written masks or reticles then can be used in a photolithographic process to expose selected areas of a wafer to light or other radiation in order to produce the desired integrated microdevice structures on the wafer.

While a variety of electronic design automation tools are required to create a modern microdevice, it is often difficult for a designer to select any particular electronic design automation tool for use. Many electronic design automation tools are relatively expensive. A single licensed copy or "seat" of a layout design verification tool, for example, may cost more than the salary for several design engineers. Along with its expense, a designer must consider the suitability of a particular electronic design automation tool for its intended purpose. For example, a particular formal verification tool may be capable of identifying faults in a given circuit that other, seemingly equivalent, formal verification tools will miss. In some instances, a designer may identify an electronic design automation tool that is suitable for addressing a specific problem, but the problem may not occur often enough to justify the expense of that particular electronic design automation tool.

Accordingly, a designer or manufacturer will try to thoroughly evaluate an electronic design automation tool before its purchase. This type of evaluation is not trivial, however. Because of the value of electronic design automation tools and the risk of copying, some electronic design automation tool vendors are reluctant to provide tools for unrestricted evaluation at a customer's work site. Similarly, many customers are reluctant to evaluate confidential and proprietary designs at a vendor's work site, which may be accessible to competitors.

Even after a designer or manufacturer has purchased an electronic design automation tool, its complexity may make training for the tool difficult. For example, an electronic design automation tool vendor may need to spend several days teaching a design engineer how to use a particular electronic design automation tool. Teaching several design engineers in disparate locations thus may require a substantial investment of time and teaching resources. Even if all of the engineers are taught simultaneously using teleconferencing equipment, their computers must be similarly configured at each of the different locations.

BRIEF SUMMARY

Aspects of the invention relate to various arrangements for providing a user with virtual use of a software tool, such as an electronic design automation tool. Various implementations of the invention may allow a user to evaluate a software tool from a remote location, without having to purchase the software tool or set up an instance of the software tool on a local computer. Some implementations of the invention may allow an instructor to teach multiple users at different locations how to use a commonly configured version of a software tool. Still further, some implementations of the invention may permit a user to conveniently purchase the use of a software tool for discrete time periods or projects, without having to purchase the tool itself.

With various embodiments of the invention, a control server facilitates communication between a tool server hosting an instance of a software tool and a client device employed by a user of the software tool. The client device initially contacts the control server to request the use of the software tool. In response, the control server arranges for a separate computer to be configured as a tool server that can provide remote access to an instance of the software tool. With some implementations of the invention, the control server will provide usage information to the tool server that will control how the software tool may be used. The usage information may include, for example, parameter values for controlling how a user of the client device may use the tool server and the software tool. The usage information may also include information that associates a memory resource of the tool server with a user of the client device.

The control server also provides connection information to the client device, which the client device then can use to establish a connection with the tool server. With various embodiments of the invention, the control server provides the connection information in a file format compatible with a remote connection application hosted on the client device. The connection information may include, for example, the socket port number through which the client device should communicate with the tool server. If the control server provides the connection information after the tool server has been configured, then the connection information also may include information relating to the tool server.

Using the connection information, the client device then establishes a remote connection with the tool server, allowing the user of the client device to use the software tool hosted on the tool server through the remote connection. Correspondingly, the tool server will employ the usage information to determine how the user may use the software tool.

These and other aspects of the invention will be apparent in view of the accompanying drawings and detailed description.

DETAILED DESCRIPTION OF EMBODIMENTS OF THE INVENTION

Illustrative Operating Environment

Aspects of various embodiments of the invention may be implemented using computer-executable software instructions executed by one or more programmable computing devices. Because these aspects may be implemented using such a programmed computing device, the components and operation of a generic programmable computer system will first be described. This implementation environment is only one example of a suitable implementation environment, however, and is not intended to suggest any limitation as to the scope of use or functionality of the embodiments of the invention.

Figure 1:
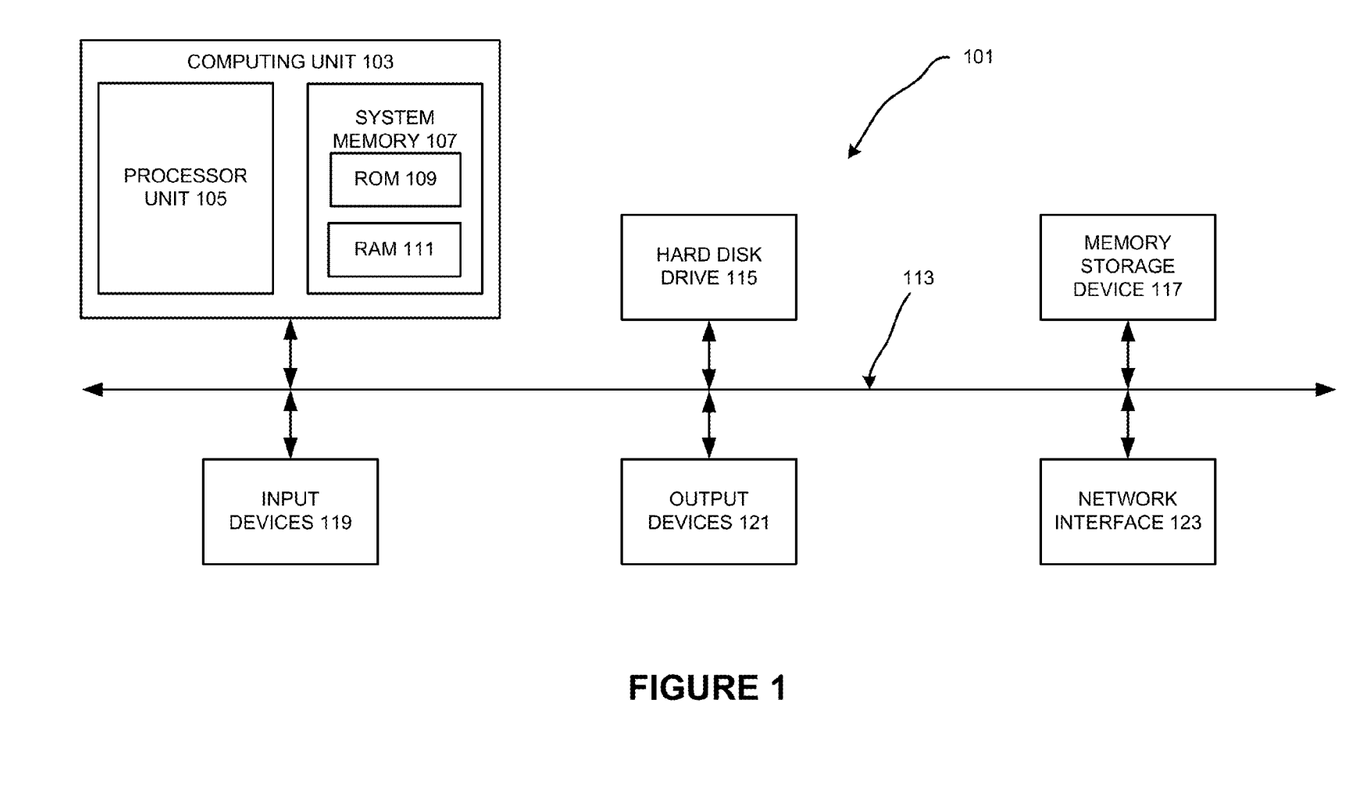
FIGS. 1 and 2 illustrate an example of a computing system that may be used to implement various embodiments of the invention.

FIG. 1 shows an illustrative example of a computing device 101. As seen in this figure, the computing device 101 includes a computing unit 103 with a processor unit 105 and a system memory 107. The processor unit 105 may be any type of programmable electronic device for executing software instructions, but will typically include one or more microprocessors. The system memory 107 may include both a read-only memory (ROM) 109 and a random access memory (RAM) 111. As will be appreciated by those of ordinary skill in the art, both the read-only memory (ROM) 109 and the random access memory (RAM) 111 may store software instructions for execution by the processor unit 105.

The processor unit 105 and the system memory 107 are connected, either directly or indirectly, to one or more peripheral devices through a bus 113 or alternate communication structure. For example, the processor unit 105 or the system memory 107 may be directly or indirectly connected to one or more additional memory storage devices 117, such as a "hard" magnetic disk drive, a removable magnetic disk drive, an optical disk drive, or a flash memory card. The processing unit 105 and the system memory 107 also may be directly or indirectly connected to one or more input devices 119 and one or more output devices 121. The input devices 119 may include, for example, a keyboard, a pointing device (such as a mouse, touchpad, stylus, trackball, or joystick), a scanner, a camera, or a microphone. The output devices 121 may include, for example, a monitor display, a printer and speakers. With various examples of the computer 101, one or more of the peripheral devices 115-121 may be internally housed within the computing unit 103. Alternately, one or more of the peripheral devices 115-121 may be external to the housing for the computing unit 103 and connected to the bus 113 through, for example, a Universal Serial Bus (USB) connection.

With various implementations of the invention, the computing device 101 also will have one or more network interfaces 123. A network interface 123 allows the computing device 101 to communicate with other computers or electronic device through a communication network connection. The communication network may be any suitable type of network including, for example, a conventional wired network connection or an optically-transmissive wired network connection. The communication network connection may also be a wireless connection, such as a wireless optical connection, a radio frequency connection, or an infrared connection. The network interface 123 translates data and control signals from the computing device 101 into network messages according to one or more communication protocols, such as the transmission control protocol (TCP), the user datagram protocol (UDP), and the Internet protocol (IP). These and other conventional communication protocols are well known in the art, and thus will not be discussed here in more detail.

The processor unit 105 may include a commercially generic programmable microprocessor, such as Intel® Pentium® or Xeon™ microprocessors, Advanced Micro Devices Athlon™ microprocessors or Motorola 68K/Coldfire® microprocessors. Alternately or additionally, the processor unit 105 may include one or more custom-manufactured processors, such as a microprocessor designed to optimally perform specific types of mathematical operations. Further, the processor unit 105 may include a processor unit having more than one processor core.

Figure 2:
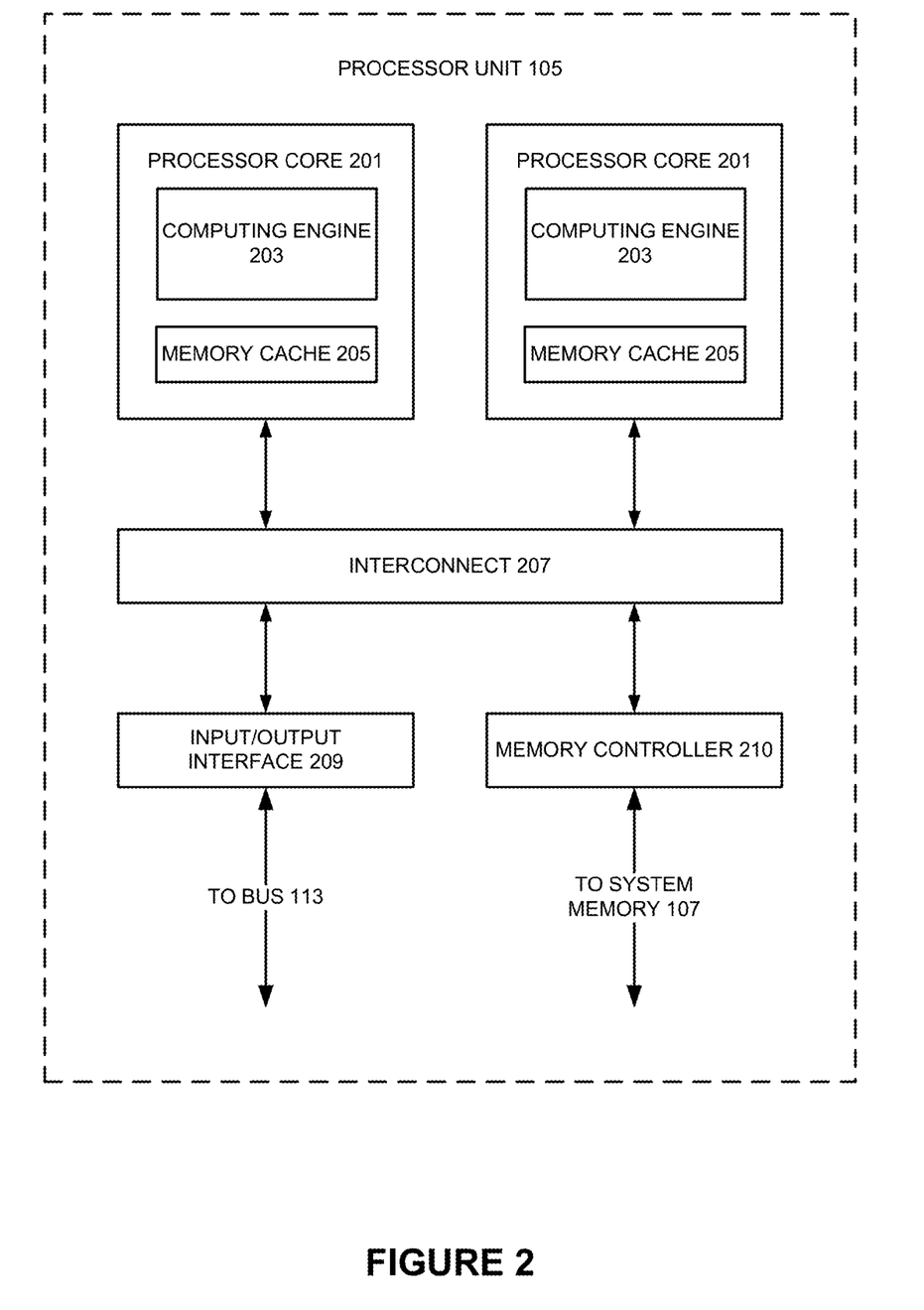

Accordingly, FIG. 2 illustrates an example of a multi-core processor unit 105 that may be employed with various embodiments of the invention. As seen in this figure, the processor unit 105 includes a plurality of processor cores 201. Each processor core 201 includes a computing engine 203 and a memory cache 205. As known to those of ordinary skill in the art, a computing engine contains logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203 may then use its corresponding memory cache 205 to quickly store and retrieve data and/or instructions for execution.

Each processor core 201 is connected to an interconnect 207. The particular construction of the interconnect 207 may vary depending upon the architecture of the processor unit 105. With some types of processor units 105, such as the Cell microprocessor created by Sony Corporation, Toshiba Corporation and IBM Corporation, the interconnect 207 may be implemented as an interconnect bus. With other processor units 201, however, such as the Opteron™ and Athlon™ dual-core processors available from Advanced Micro Devices of Sunnyvale, Calif., the interconnect 207 may be implemented as a system request interface device. In any case, the processor cores 201 communicate through the interconnect 207 with an input/output interfaces 209 and a memory controller 211. The input/output interface 209 provides a communication interface between the processor unit 105 and the bus 113. Similarly, the memory controller 211 controls the exchange of information between the processor unit 105 and the system memory 107. With some implementations of the invention, the processor unit 105 may include additional components, such as a high-level cache memory accessible shared by the processor cores 201.

While FIG. 2 shows one illustration of a processor unit 105 that may be employed by some embodiments of the invention, it should be appreciated that this illustration is representative only, and is not intended to be limiting. It should similarly be appreciated that the description of the computer device 101 illustrated in FIG. 1 is provided as an example only, and it not intended to suggest any limitation as to the scope of use or functionality of alternate embodiments of the invention.

Communication Network

Figure 3:
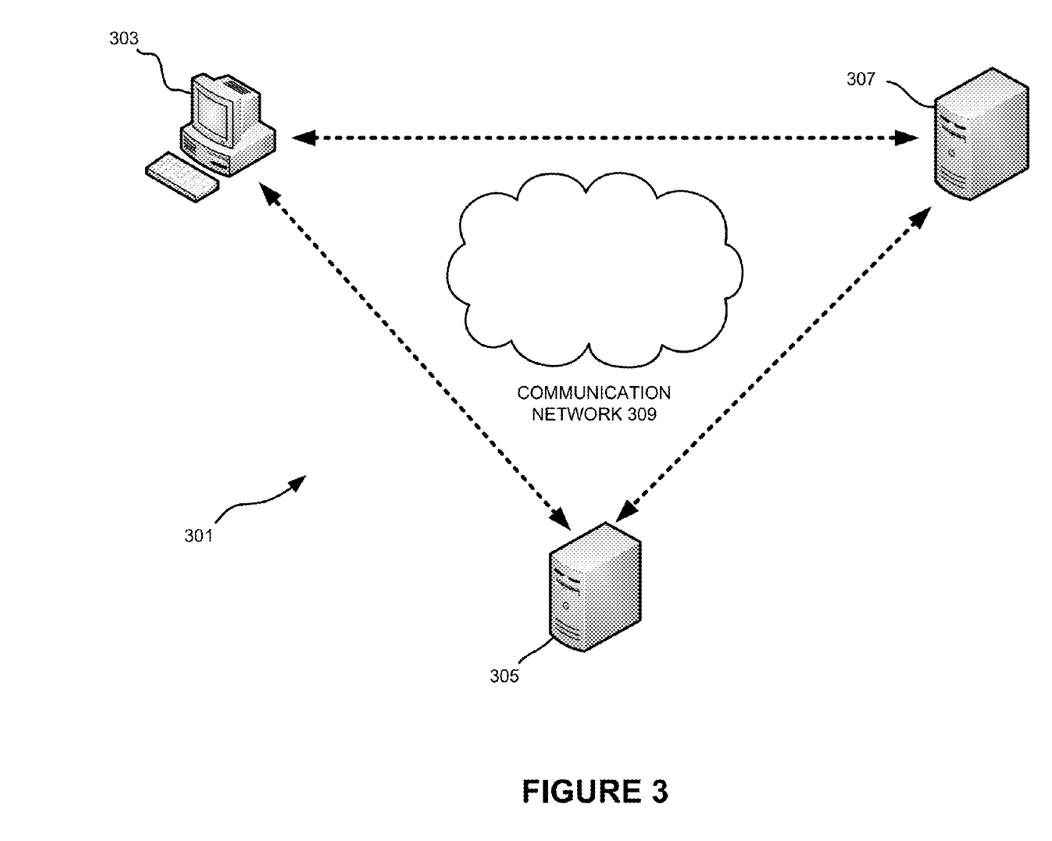
FIG. 3 illustrates a network system that may be used to provide virtual use of a software tool according to various embodiments of the invention.

FIG. 3 illustrates a network system 301 that may be used to provide virtual use of a software tool according to various embodiments of the invention. As seen in this figure, the network system 301 includes a client device 303, a control server 305, and a software tool server 307. Each of the client device 303, control server 305, and software tool server 307 may communicate with the other members of the network system 301 through a communication network 309. Typically, the communication network 309 will be a public communication network, such as the Internet. It should be appreciated, however, that each of the client device 303, control server 305, and software tool server 307 may communicate over any communication network, including various types of private or semi-private communication networks. Also, while the communication network 309 is shown as a single communication network, with various implementations of the network system 301 the communication network 309 may encompass a plurality of communications networks, including one or more public, semi-private and private communications networks.

Each of the client device 303, control server 305, and software tool server 307 may be implemented by a computing device, such as a suitable configuration of the illustrative computing device 101 discussed in detail above. As will be appreciated from the following description, the client device 303 optionally may be implemented using a simpler configuration of a computing device than the control server 305 or the software tool server 307.

Client Device

Figure 4:
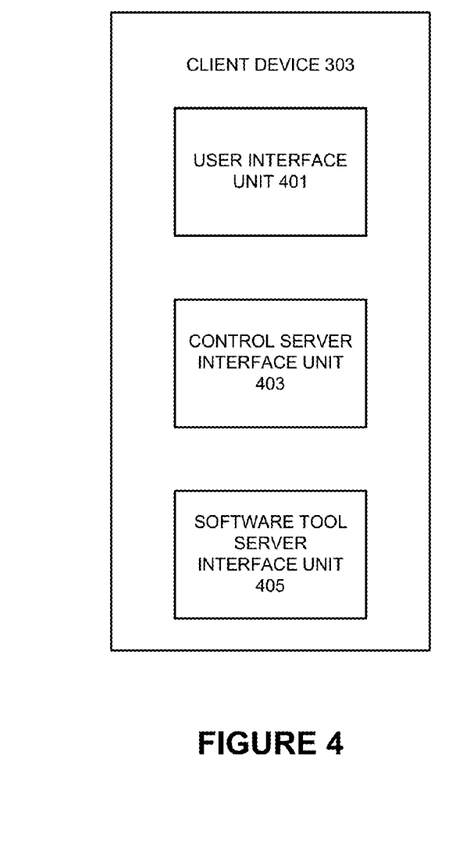
FIGS. 4-6 illustrate components of the network system shown in FIG. 3.

Turning now to FIG. 4, the client device 303 includes a user interface unit 401, a control server interface unit 403, and a software tool server interface unit 405. The user interface unit 401 provides an interface through which a user, such as a microdevice designer, can provide information to and receive information from the client device 303. The user interface may be any conventional user interface, such as the graphical user interfaces provided by a Microsoft® Windows® operating system, a Linux® operating system or a Unix® operating system. As will be appreciated by those of ordinary skill in the art, the user interface provided by the user interface unit 401 allows the user of the client device 303 to interact with the control server interface unit 403 and the software tool server interface unit 405.

The control server interface unit 403 provides an interface for communications between the client device 303 and the control server 305 through the communication network 309. With various examples of the invention, the control server interface unit 403 may implement a conventional Web browser to provide the interface, such as a Microsoft® Explorer® Web browser, a Mozilla Firefox Web browser, or a Google Chrome Web browser.

Similarly, the software tool server interface unit 405 provides an interface for communications between the client device 303 and the software tool server 307 through the communication network 309. With various examples of the invention, the software tool server interface unit 405 provides the user of the client device 303 with remote access to the desktop environment of the software tool server 307. For example, with some embodiments of the invention, the software tool server interface unit 405 may employ a Microsoft® Desktop Connection application or a Citrix® desktop virtualization application to provide the interface for communications between the client device 303 and the software tool server 307.

As previously noted, the client device 303 may be implemented using a computing device, such as the computing device 101. Accordingly, for those embodiments, each of the user interface unit 401, the control server interface unit 403, and the software tool server interface unit 405 may then be implemented by a computing device programmed to perform the functions of that unit, or by purpose-specific hardware configured to perform the functions of that unit. Also, while each of the user interface unit 401, the control server interface unit 403, and the software tool server interface unit 405 have been described as separate items for ease of understanding, it should be appreciated that the functionality of one or more of these units may be combined, divided further, or otherwise rearranged as desired.

Control Server

Figure 5:
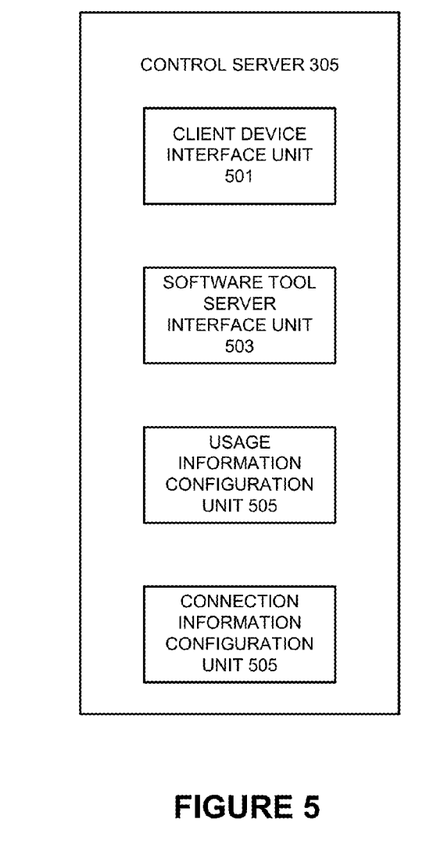

FIG. 5 illustrates an example of a control server 305 that may be employed according to various embodiments of the invention. The control server 305 includes a client device interface unit 501, a software tool server interface unit 503, a usage information configuration unit 505, and a connection information configuration unit 507. The control server 305 may be maintained, for example, by the manufacturer or distributor of the software tool to be provided by the software tool server 307.

The client device interface unit 501 provides an interface for communications between the client device 303 and the control server 305 through the communication network 309. As previously noted, the control server interface unit 403 of the client device 303 may implement a conventional Web browser to communicate with the control server 305. Accordingly, the client device interface unit 501 may implement a corresponding interface application, such as an HTTP or HTTPS server, to communicate with the client device 303. As will be appreciated by those of ordinary skill in the art, a HTTPS server can provide more secure communications between the client device 303 and the control server 305.

The software tool server interface unit 503 similarly provides an interface for communications between the control server 305 and the software tool server 307 through the communication network 309. This interface need not provide for any direct user interaction, as will be discussed in detail below. Accordingly, the software tool server interface unit 503 may implement any desired interface for communicating with the software tool server 307.

The usage information configuration unit 505 configures usage information for the software tool server 307. The usage information controls how a particular user of the client device 303 may use an instance of the software tool hosted on the software tool server 307. For example, the usage information may determine that a user may only use the hosted software tool for a maximum amount of time. The usage information also may determine that the total maximum use time be broken up into distinct sessions, each of a specified time duration. Still further, the usage information may determine how much operational data can be used with the hosted software tool. For example, if the hosted software tool is an electronic design automation tool for analyzing circuit designs, then the usage information may limit the number of circuit designs (or the size of a circuit design or designs) that a user may provide to the tool for analysis. The usage information also may determine costs associated with using the hosted software tool. For example, the usage information may associate a billing scheme, such as cost per minute, cost per byte of provided data, cost per performed operation, or some combination thereof, with the user of the client device 303.

With various examples of the invention, the usage information also will associate a user of the client device 303 with a specific memory resource of the software tool server 307. The memory resource may be, for example, a particular magnetic hard drive available to the software tool server 307, or even a particular range of memory on a larger memory storage device (including a magnetic hard drive). The software tool server 307 can then use this memory resource to save any information created by or otherwise associated with the user's use of the hosted software tool. As will be discussed in detail below, the memory resource may be shared among a plurality of software tool servers 307 capable of hosting the software tool.

As described above, with various implementations of the invention, the user will be a particular person using the client device 303, such as a particular circuit designer. With these implementations, user-related information, such as the usage information and connection information, may be expected to change from person to person. It should be appreciated, however, that the term "user" as employed above also encompasses implementations where the user is the client device 303 itself. Thus, with these implementations, user related information may not change even if different persons employ the client device 303.

The connection information configuration unit 507 configures connection information for the client device 303. More particularly, the connection information configuration unit 507 compiles information that will facilitate a connection between the client device 303 and the software tool server 307, and then provides that information to the client device 303 for use in establishing and maintaining a connection with the software tool server 307.

With some implementations of the control server 305, the connection information configuration unit 507 will maintain a record of all previous communications between virtual users of the software tool and an instance of the software tool server 307. Further, some implementations of the control server 305 may use this information to identify previous virtual users associated with the client device 303. For example, the user of the client device 303 may belong to a company, organization or other entity that has other members who have previously used an instance of the client device 303 to successfully access an instance of the software tool server 307. The connection information configuration unit 507 may employ a variety of techniques to identify other virtual users of the software tool associated with the client device 303. For example, the client device interface unit 501 may require the electronic mail address of the user of the client device 303. The connection information configuration unit 507 can then compare the domain name in the electronic mail address with the domain names in electronic mail addresses of previous virtual users of the software tool, to identify corresponding or similar domain names. Of course, still other techniques, such as comparing TCP/IP addresses can alternately or additionally be employed to identify other virtual users of the software tool associated with the client device 303.

If the connection information configuration unit 507 identifies one or more other virtual users associated with the client device 303, then the connection information configuration unit 507 may provide information from those previous successful connections to the client device 303 for use in establishing a new connection with the software tool server 307. For example, if a previous user associated with the client device 303 was able to establish a successful connection with an instance of the software tool server 307 through a particular Internet socket port number, then the connection information configuration unit 507 will provide that Internet socket port number to the client device 303 in the connection information. Of course, still other information, such as TCP/IP addresses used for those prior successful connections, also may be provided with the connection information.

Still other information may alternately or additionally be included in the connection information. For example, if the connection information is compiled after the software tool server 307 has been configured, then the connection information configuration unit 507 may include information specific to that instance of the software tool server 307 in the connection information. This type of connection information may include, e.g., a display screen resolution for the software tool server 307, a particular TCP/IP address for the software tool server 307, etc. As previously noted, various implementations of the client device 303 may employ a desktop access or virtualization application to connect with the software tool server 307. Accordingly, some implementations of the connection information configuration unit 507 will package some or all of the connection information into a convenient format for the appropriate desktop access or virtualization application. The connection information may be provided, for example, in a file format that the desktop access or virtualization application will use to automatically establish a connection to the software tool server 307 with little or no input from the user.

As previously noted, the control server 305 may be implemented using a computing device, such as the computing device 101. Accordingly, for those embodiments, each of the client device interface unit 501, the software tool server interface unit 503, the usage information configuration unit 505 and the connection information configuration unit 507 may then be implemented by a computing device programmed to perform the functions of that unit, or by purpose-specific hardware configured to perform the functions of that unit. Also, while each of the client device interface unit 501, the software tool server interface unit 503, the usage information configuration unit 505 and the connection information configuration unit 507 have been described as separate items for ease of understanding, it should be appreciated that the functionality of one or more of these units may be combined, divided further, or otherwise rearranged as desired.

Tool Server

Figure 6:
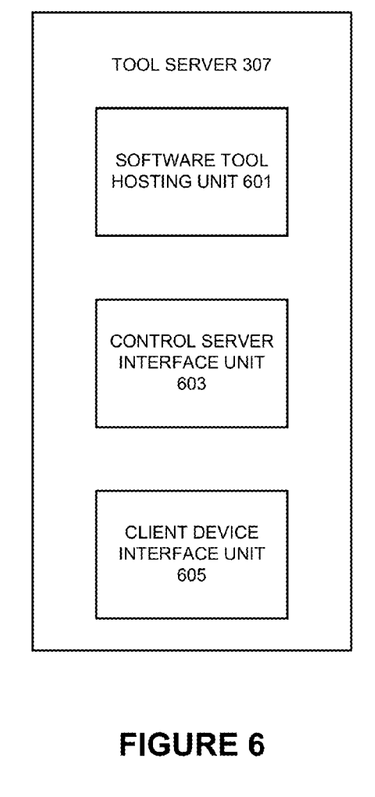

Turning now to FIG. 6, the software tool server 307 includes a software tool hosting unit 601, a control server interface unit 603, and a client device interface unit 605. The software tool hosting unit 601 hosts an instance of a desired software tool, such as an electronic design automation software tool. The control server interface unit 603 then provides an interface for communications between the control server 305 and the software tool server 307 through the communication network 309. As previously noted, this interface need not provide for any direct user interaction, so the software tool server interface unit 503 may implement any desired interface for communicating with the software tool server 307. The client device interface unit 605 then provides an interface for communications between the client device 303 and the software tool server 307 through the communication network 309. As also previously noted, various implementations of the client device 303 may employ a desktop access or virtualization application to connect with the software tool server 307. Accordingly, the client device interface unit 605 typically will be configured to communicate with interface provided by the client device 303.

With some examples of the network system 301, a computer will be selected from a plurality of available computers, and then configured to be the software tool server 307. With various implementations of the network system 301, the available computers may be maintained by the manufacturer or distributor of the software tool. For still other implementations of the network system 301, however, the available computers may alternately or additionally be maintained by a third party.

According to some implementations of the invention, an entity or entities responsible for configuring the software tool server 307 may have access to a variety of available computers located at disparate geographical locations. With these implementations, the responsible entity or entities may obtain geographical information for the client device 303, from its IP/TCP information, for example, and employ that geographical information to select configure the software tool server 307 on an available computer geographically closer to the client device 303 than other available computers.

As previously noted, the software tool server 307 may be implemented using a computing device, such as the computing device 101. Accordingly, for those embodiments, each of the software tool hosting unit 601, the control server interface unit 603, and the client device interface unit 605 may then be implemented by a computing device programmed to perform the functions of that unit, or by purpose-specific hardware configured to perform the functions of that unit. Also, while each of the software tool hosting unit 601, the control server interface unit 603, and the client device interface unit 605 have been described as separate items for ease of understanding, it should be appreciated that the functionality of one or more of these units may be combined, divided further, or otherwise rearranged as desired.

Operation of the Network

Figure 7A:
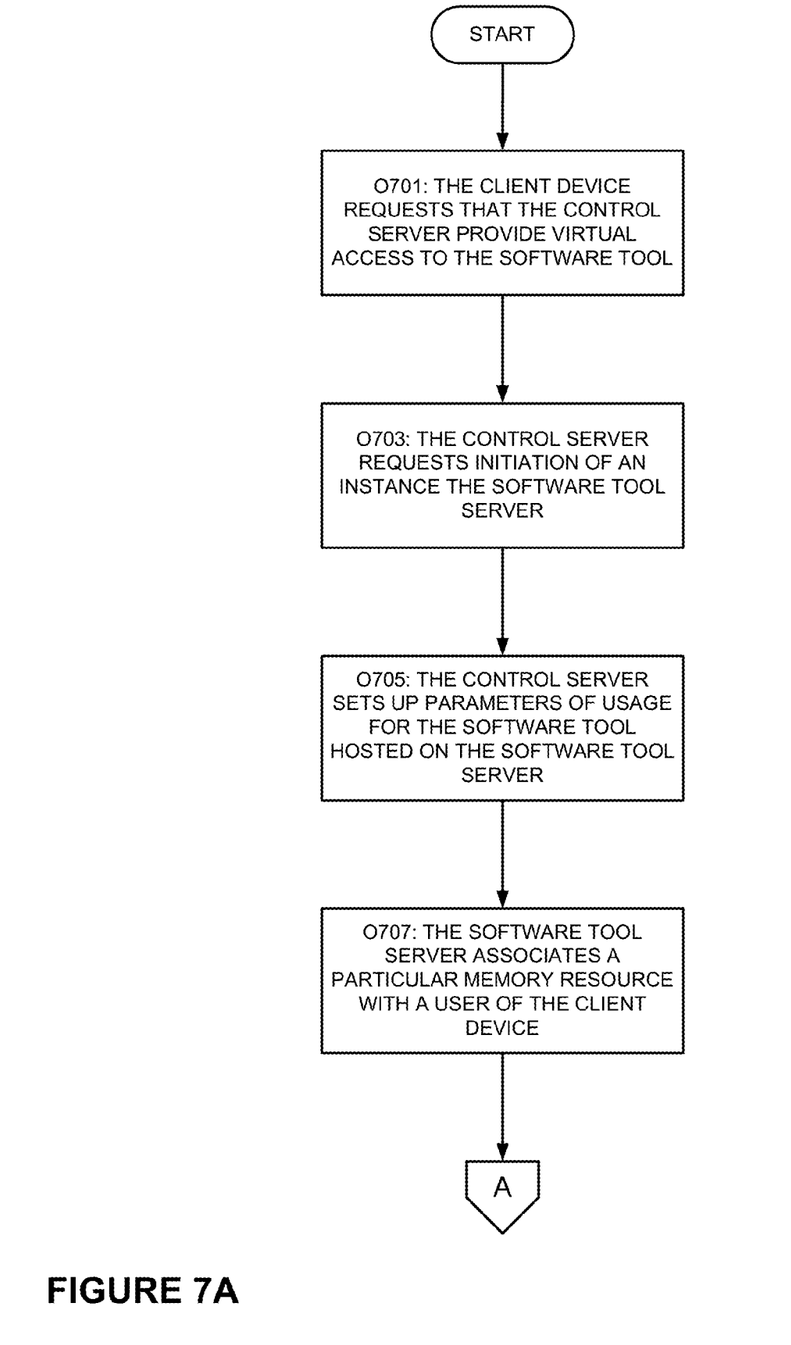
FIGS. 7A and 7B illustrate the operation of virtual use of a software tool according to various examples of the invention.
Figure 7B:
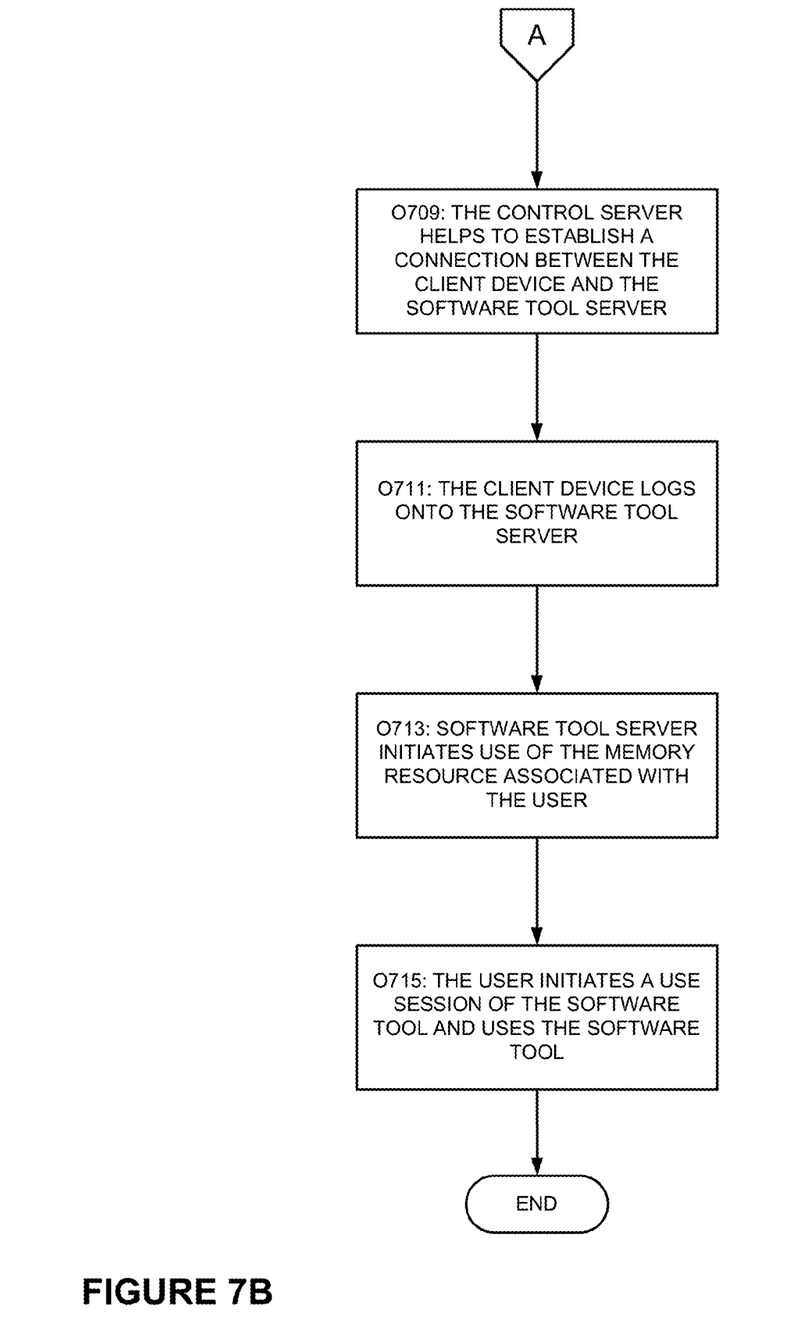

A method for virtual use of a software tool according to various implementations of the invention will now be described with reference to the flowchart shown in FIG. 7. For ease of understanding, this operation will be described as being implemented by the network system 301 shown in FIG. 3. It should be appreciated, however, that the method for virtual use of a software tool shown in FIG. 7 may be implemented using other systems according to various embodiments of the invention. Similarly, the network system 301 shown in FIG. 3 may be used to implement other methods for virtual use of a software tool according to various embodiments of the invention.

Initially, in operation 701, the client device 303 establishes a connection to the control server 305, and requests that the control server 305 arrange to have virtual access to software tool (e.g., a "virtual lab") provided for the user of the client device 303. In response, the control server 305 contacts the entity maintaining one or more computers available to serve as a software tool server 307, and requests initiation of an instance the software tool server 307 in operation 703. With various implementations of the invention, the entity may already have one or more computers configured to act as a software tool server 307. Alternately, the entity may have access to a library of previously-configured computer images, each one corresponding to a specific software tool. The entity can then select the appropriate image, and configure an available computing device to provide an instance of the software tool server 307. In this manner, multiple instances of the software tool server 307 can simultaneously be provided to multiple users of multiple instances of the client device 303.

In addition to requesting the provision of an instance of the software tool server 307, in operation 705 the control server 305 also sets up parameters of usage for the software tool hosted on the software tool server 307. These usage parameter values may include, for example, the length of each usage session available to the user, scheduling of sessions, number of allowable sessions, etc. Some parameters, such as session time, may have default values (e.g., saved in the image itself) that can, in some implementations, be changed by an authorized entity. In operation 707, the control server 305 will also have the software tool server 307 associate a particular memory resource with a user of the client device 303, as discussed above. Also, the control server 305 may reserve a particular TCP/IP address for the software tool server 307, which can then be provided to the client device 303 with the connection information.

Next, the control server 305 helps to establish a connection between the client device 303 and the software tool server 307. As previously noted, with various implementations of the invention, the connection information configuration unit 507 of the control server 305 will maintain a record of all previous communications between virtual users of the software tool and an instance of the software tool server 307. If that particular instance of the client device 303 has ever successfully connected to an instance of the software tool server 307, then the connection information configuration unit 507 obtains some or all of the information (e.g., an Internet socket port number) relating to that previous successful connection for inclusion in the connection information. If not, then the connection information configuration unit 507 checks to see if any other virtual users of the software tool associated with the client device 303 have successfully established a connection with an instance of the software tool server 307. The connection information configuration unit 507 will then obtain some or all of the connection information relating to one or more of those previous successful connections for inclusion in the connection information. If no previous related successful connections can be identified, then the connection information configuration unit 507 may simply select default connection information.

As previously noted, the connection information configuration unit 507 may also collect other useful connection information, such as a display resolution for the software tool server 307, trust or security information, etc. for inclusion in the connection information. With some implementations of the control server 305, the usage information configuration unit 505 will compile some or all of the connection information into a form (e.g., a formatted file) that can be easily employed by a remote connection tool on the client device 303. Connection between the client device 303 and the software tool server 307 can then be established simply by launching the remote connection tool using the configured file.

Also, various implementations of the control server 305 may provide some relevant portion of the connection information to the software tool server 307. For example, some implementations of the control server 305 may employ a secure communication technique, such as SSH tunneling, to alert the software tool server 307 as to which Internet socket port number it should listen on to connect to the client device 303.

Once a connection between the client device 303 and the software tool server 307 has been established, in operation 711 the user of the client device 303 can log onto (or otherwise provide identifying information to) the software tool server 307. In response, the software tool server 307 launches the desired software tool. The software tool server 307 will also initiate use of the memory resource associated with the identified user in operation 713. In addition, the software tool server 307 may establish a connection to multiple computers if, for example, the software tool is one that requires parallel processing.

After the connection between the client device 303 and the software tool server 307 has been establish, in operation 715 the user can initiate a use session of the software tool and use the software tool as desired and allowed by the usage information. With some implementations of the invention, operational data to be used can preloaded to the memory resource associated with the user of the client device 303. Further, the usage parameters may limit the use of the software tool to only the operational data located at the memory resource associated with the user for the duration of the user's use session. Various implementations may allow the operational data to be securely loading to the memory resource associated with the user.

With various examples of the invention, all future use sessions (both with the current instance of the software tool server 307 and future instances of the software tool server 307) would be mapped to the memory resource associated with the user. With some implementations, the software tool server 307 can provide a secure connection between the user's local computer and the memory resource associated with the user, to allow the user to secure download the operational data and/or the results of executing the software tool on the operational data (using, e.g., an FTP server, a Web site, etc.)

During the use session, the connections between the control server 305 and the client device 303 and software tool server 307 can be maintained. In this manner, the use of the software tool can be monitored by the control server 305. For example, when a user initiates a usage session, the software tool server 307 can report the log in, session duration, etc. to the control server 305. The control server 305 then can send reminders and other notices (upcoming total usage time expiration, upcoming session time expiration, etc.) to the client device 303 outside of the client device 303/software tool server 307 connection.

With various implementations, when a use session ends, the software tool server 307 will use the "suspend" function to store the data associated with the session. As will be appreciated by those of ordinary skill in the art, the "suspend" function writes the entire memory state for the session to a memory location. Some implementations of the software tool server 307 will write the entire memory state for the session specifically to the memory resource associated with the user. Thus, when a user returns to a use of the software tool, the new instance of the software tool server 307 can resume where the previous session ended. Further, if the memory resource associated with the user can be shared by multiple available computers, any new instance of the software tool server 307 can resume where the previous session ended

CONCLUSION

While the invention has been described with respect to specific examples including presently preferred modes of carrying out the invention, those skilled in the art will appreciate that there are numerous variations and permutations of the above described systems and techniques that fall within the spirit and scope of the appended claims. For example, while specific terminology has been employed above to refer to electronic design automation processes, it should be appreciated that various examples of the invention may be implemented using any desired combination of electronic design automation processes.

What is claimed is:

1. A method of providing use of a software tool, comprising:
   by a control server:
      receiving a request from a client device separate from the control server to use an electronic design automation (EDA) software tool provided by a tool server separate from the control server and the client device, the request being associated with a particular user;
      responsive to the receiving the request, causing a computer system to instantiate the tool server to provide use of the EDA software tool to the client device;
      sending usage information to the tool server, the usage information comprising parameter values that control how the particular user of the client device may use an instance of the EDA software tool, the parameter values being selected based on the particular user for which the request is associated and the parameter values limiting the number of circuit designs or a size of circuit designs that the particular user may provide to the EDA software tool for analysis; and providing the client device with connection information to establish a remote connection between the client device and the tool server.

2. The method recited in claim 1, further wherein the control server causing the computer system to instantiate the tool server includes:

identifying an entity associated with the client device;

determining an electronic communication port value for a previously successful remote connection between another computer system instantiating the EDA software tool and another client device associated with the entity; and configuring the tool server instantiated on the computer system to employ the electronic communication port value for remotely connecting with client device.

3. The method recited in claim 2, wherein the control server provides the client device with connection information that includes the port value.

4. The method recited in claim 2, wherein the client device and the another client device are the same.

5. The method recited in claim 2, wherein the computer system and the another computer system are the same.

6. The method recited in claim 2, wherein identifying the entity associated with the client device includes obtaining entity identification information from the particular user of the client device.

7. The method recited in claim 6, wherein the entity identification information is an electronic mail address; and the entity with the client device is identified based upon a domain name of the electronic mail address.

8. The method recited in claim 2, wherein the entity associated with the client device is identified by obtaining an internet protocol address associated with the client device.

9. The method recited in claim 1, wherein:

the control server causing the computer system to instantiate the tool server includes configuring the tool server instantiated on the computer system to employ a specific internet protocol address; and the control server providing the client device with connection information includes providing the specific internet protocol address.

10. The method recited in claim 9, wherein the control server causing the computer system to instantiate the tool server includes selecting the specific internet protocol address from a pool of internet protocol addresses.

11. The method recited in claim 1, wherein the control server causing the computer system to instantiate the tool server includes:

identifying a geographic location of the client device; and selecting the computer system from a plurality of computer systems based upon a geographic proximity of the computer system to the geographic location of the client device.

12. The method recited in claim 1, wherein the control server providing the client device with connection information for remotely connecting to the tool server instantiated on the computer system includes:

obtaining configuration information from the computer system;

packaging the configuration information into a configuration file that can be used by a remote connection application employed by the client device; and providing the configuration file to the client device for use by the remote connection application.

13. The method recited in claim 12, wherein the configuration information includes one or more of the group consisting of: a name for the computer system, a screen resolution for the computer system, an electronic communication port value, and an internet protocol address.

14. The method recited in claim 12, wherein the control server providing the client device with connection information for remotely connecting to the tool server instantiated on the computer system includes configuring the remote connection application to automatically employ the provided configuration file.

15. The method recited in claim 1, wherein the usage information associates a memory resource of the tool server with the particular user of the client device.

16. The method recited in claim 1, wherein the parameter values include one or more values selected from the group consisting of: a total maximum use time value, a session maximum use time value, a maximum session value, a maximum data output value, a maximum design value, and a cost value.

17. The method of claim 1, wherein the connection information comprises information relating to a previous successful connection for a user associated with the client device.

18. The method recited in claim 1, further comprising:

determining a previous user associated with the client device of the EDA software tool, having previous successful connection information; and, obtaining at least a portion of the previous successful connection information for providing as the connection information to the client device.

19. One or more non-transitory computer-readable storage media storing computer-executable instructions that when executed by a computer cause the computer to perform a method, the method comprising:

receiving a request from a client device separate from a control server to use an electronic design automation (EDA) software tool provided by a tool server separate from the control server and the client device;

arranging for a computer system to instantiate the tool server for providing use of the EDA software tool to the client device;

sending usage information to the tool server which controls how a particular user of the client device may use the software tool, wherein the usage information is specific to the particular user and associates the particular user with a specific memory resource of the tool server and wherein the usage information comprises parameter values that limit the number of circuit designs or a size of circuit designs that the particular user may provide to the EDA software tool for analysis;

providing the client device with connection information that can be used to establish a remote connection between the client device and the tool server; and establishing the connection between the client device and the tool server.

20. The one or more non-transitory computer-readable storage media comprising computer-executable instructions of claim 19, wherein the method further comprises:

providing the tool server with a portion of the connection information; and wherein the connection information provided by the control server comprises connection information relating to a previous successful connection or default connection information if no previous successful connection can be identified.

21. The one or more non-transitory computer-readable storage media comprising computer-executable instructions of claim 20, wherein the previous successful connection information is identified by:
   obtaining some or all of the connection information relating to a previous successful connection for the client device; and
   if the client device has not previously successfully connected, having the control server obtain some or all of the connection information relating to a previous successful connection of another user associated with the client device.

22. A control server for providing use of a software tool, the control server comprising:
   memory;
   at least one processor coupled to the memory;
   at least one network interface coupled to the processor and providing a communication interface to a tool server and a client device; and
   the control server being configured to:
      receive a request from a user of the client device to use an electronic design automation (EDA) software tool,
      request a resource from a plurality of available resources and send a message to instantiate the tool server on the selected resource, the message indicating that the tool server is to
      provide the EDA software tool for use by the client device, provide the client device with connection information for use in establishing and maintaining a connection to the tool server,
      transmit usage information configured based on the user to the tool server, the usage information controlling at least in part how the user of the client device may use the EDA software tool, the usage information configured based on the user, the usage information comprising at least one of a session schedule, a maximum sessions value, a maximum data output value, a maximum design value, an operational data value, a memory resource value, or a cost value, the usage information comprising parameter values that limit the number of circuit designs or a size of circuit designs that the particular user may provide to the EDA software tool for analysis,
      initiate establishment of the connection between the client device and the tool server, thereby causing a connection between the control server and the client device to be maintained such that the control server monitors the use of the EDA software tool and maintains a record of previous communications between users of the EDA software tool and the tool server, and
      send notices to the client device based on the usage information and information in the record of previous communications.

23. The system of claim 22, wherein:
the control server monitors the use of the software tool pursuant to usage parameters in the usage information for the software tool for the particular user.

24. The system of claim 23, wherein:
the usage parameters limit the use of the EDA software tool to only the operational data located at a memory resource associated with the particular user.

25. The system of claim 22, wherein:
the control server sends one or more of the notices regarding the usage information to the client device outside of the connection between the client device and the tool server.

26. The method recited in claim 1, wherein the parameter values included in the usage information include at least one parameter value for determining costs associated with use of the tool server by the particular user of the client device.

* * * * *